US008763075B2

(12) United States Patent
Guevin et al.

(10) Patent No.: US 8,763,075 B2
(45) Date of Patent: Jun. 24, 2014

(54) METHOD AND APPARATUS FOR NETWORK ACCESS CONTROL

(75) Inventors: Thomas F. Guevin, Nashua, NH (US); Sohil Babubhai Thakkar, North Andover, MA (US); Duane Charles Compton, Cambridge, MA (US); Patrick Joseph Foy, Reading, MA (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 13/413,813

(22) Filed: Mar. 7, 2012

(65) Prior Publication Data
US 2012/0233657 A1   Sep. 13, 2012

Related U.S. Application Data

(60) Provisional application No. 61/449,970, filed on Mar. 7, 2011.

(51) Int. Cl.
*H04L 29/06* (2006.01)

(52) U.S. Cl.
CPC ........ *H04L 63/0236* (2013.01); *H04L 63/0272* (2013.01); *H04L 63/107* (2013.01)
USPC .................................. 726/1; 726/12; 726/14

(58) Field of Classification Search
CPC ............ H04L 63/0236; H04L 63/0272; H04L 63/0227; H04L 63/107; H04L 63/20; H04L 9/0827
USPC .................................................. 726/1, 12, 14
See application file for complete search history.

(56) References Cited

U.S. PATENT DOCUMENTS

| | | | | |
|---|---|---|---|---|
| 5,623,546 A * | 4/1997 | Hardy et al. | .................. | 713/193 |
| 5,825,880 A * | 10/1998 | Sudia et al. | .................. | 713/180 |
| 6,421,768 B1 * | 7/2002 | Purpura | ........................ | 711/164 |
| 6,587,946 B1 * | 7/2003 | Jakobsson | ..................... | 713/180 |
| 6,909,786 B2 * | 6/2005 | Ng et al. | ........................ | 380/286 |
| 6,965,674 B2 * | 11/2005 | Whelan et al. | ................ | 380/270 |
| 6,978,017 B2 * | 12/2005 | Wiener et al. | ................... | 380/30 |
| 6,986,049 B2 * | 1/2006 | Delany | ......................... | 713/176 |
| 7,003,110 B1 * | 2/2006 | Jakobsson et al. | ............ | 380/45 |
| 7,017,046 B2 * | 3/2006 | Doyle et al. | ................. | 713/178 |
| 7,093,280 B2 * | 8/2006 | Ke et al. | ........................... | 726/3 |
| 7,133,526 B2 * | 11/2006 | Whelan et al. | ................ | 380/270 |
| 7,210,035 B2 * | 4/2007 | Doyle et al. | ................. | 713/157 |

(Continued)

OTHER PUBLICATIONS

Josang et al., Trust Requirements in Identity Management; In proceedings of the 2005 Australasian workshop on Grid computing e-research, Austrailian Computer Society, vol. 44, pp. 99-108, 2005.

*Primary Examiner* — David Garcia Cervetti
(74) *Attorney, Agent, or Firm* — Smith Risley Tempel Santos LLC; Michael J. Tempel

(57) ABSTRACT

A method and apparatus for network access control includes an apparatus for granting a computing device access to a network, the apparatus having a plurality of substantially similar access devices, wherein each access device comprises a status-determination module to determine an access status based at least in part on whether the computing device is compliant with an access policy, an access-grant module configured for receiving an access status corresponding to the computing device from one or more of the access devices, and granting the computing device access to the network according to at least one of the access status determined by the status-determination module or the received access status.

20 Claims, 9 Drawing Sheets

(56) References Cited

U.S. PATENT DOCUMENTS

| | | | |
|---|---|---|---|
| 7,305,549 B2 * | 12/2007 | Hunt et al. | 713/155 |
| 7,353,541 B1 * | 4/2008 | Ishibashi et al. | 726/26 |
| 7,433,474 B2 * | 10/2008 | Kato et al. | 380/284 |
| 7,440,434 B2 * | 10/2008 | Chaskar et al. | 370/338 |
| 7,440,573 B2 * | 10/2008 | Lor et al. | 380/270 |
| 7,477,738 B2 * | 1/2009 | Rajamma | 380/44 |
| 7,536,723 B1 * | 5/2009 | Bhagwat et al. | 726/23 |
| 7,564,810 B2 * | 7/2009 | Hernandez et al. | 370/311 |
| 7,571,471 B2 * | 8/2009 | Sandhu et al. | 726/17 |
| 7,577,888 B2 * | 8/2009 | Sudhakar et al. | 714/732 |
| 7,590,247 B1 * | 9/2009 | Dinsmore et al. | 380/278 |
| 7,624,431 B2 * | 11/2009 | Cox et al. | 726/4 |
| 7,643,636 B2 * | 1/2010 | Kruegel | 380/264 |
| 7,657,751 B2 * | 2/2010 | Micali et al. | 713/176 |
| 7,734,045 B2 * | 6/2010 | Sandhu et al. | 380/44 |
| 7,734,911 B2 * | 6/2010 | Ganesan et al. | 713/155 |
| 7,734,912 B2 * | 6/2010 | Ganesan et al. | 713/155 |
| 7,779,071 B2 * | 8/2010 | Lor et al. | 709/203 |
| 7,818,519 B2 * | 10/2010 | Plunkett | 711/158 |
| 7,895,437 B2 * | 2/2011 | Ganesan et al. | 713/171 |
| 7,934,005 B2 * | 4/2011 | Fascenda | 709/229 |
| 7,936,878 B2 * | 5/2011 | Kune et al. | 380/264 |
| 8,045,713 B2 * | 10/2011 | Lain et al. | 380/277 |
| 8,068,487 B1 * | 11/2011 | Ke et al. | 370/389 |
| 8,099,607 B2 * | 1/2012 | Sandhu et al. | 713/189 |
| 8,126,145 B1 * | 2/2012 | Tewari et al. | 380/255 |
| 8,139,767 B2 * | 3/2012 | Camenisch et al. | 380/44 |
| 8,327,149 B2 * | 12/2012 | Micali et al. | 713/176 |
| 8,340,287 B2 * | 12/2012 | Sandhu et al. | 380/44 |
| 8,364,967 B2 * | 1/2013 | Sudia et al. | 713/180 |
| 8,407,475 B2 * | 3/2013 | Ganesan et al. | 713/171 |
| 8,416,802 B2 * | 4/2013 | Jin et al. | 370/464 |
| 8,452,011 B2 * | 5/2013 | Guo et al. | 380/241 |
| 2001/0037466 A1 * | 11/2001 | Fukutake et al. | 713/201 |
| 2002/0013898 A1 * | 1/2002 | Sudia et al. | 713/155 |
| 2002/0129241 A1 * | 9/2002 | Doyle et al. | 713/157 |
| 2003/0110376 A1 * | 6/2003 | Wiener et al. | 713/158 |
| 2003/0149781 A1 | 8/2003 | Yared et al. | |
| 2003/0219129 A1 * | 11/2003 | Whelan et al. | 380/270 |
| 2004/0054798 A1 * | 3/2004 | Frank et al. | 709/229 |
| 2004/0167984 A1 * | 8/2004 | Herrmann | 709/229 |
| 2004/0237031 A1 * | 11/2004 | Micali et al. | 715/511 |
| 2005/0018853 A1 * | 1/2005 | Lain et al. | 380/277 |
| 2005/0039017 A1 * | 2/2005 | Delany | 713/176 |
| 2005/0047598 A1 * | 3/2005 | Kruegel | 380/264 |
| 2005/0125692 A1 * | 6/2005 | Cox et al. | 713/201 |
| 2005/0141510 A1 * | 6/2005 | Narsinh et al. | 370/395.2 |
| 2005/0180568 A1 * | 8/2005 | Krause | 380/212 |
| 2005/0198258 A1 * | 9/2005 | Narsinh et al. | 709/224 |
| 2005/0204129 A1 * | 9/2005 | Sudia et al. | 713/158 |
| 2005/0246521 A1 * | 11/2005 | Bade et al. | 713/150 |
| 2005/0246768 A1 * | 11/2005 | Hunt et al. | 726/11 |
| 2006/0005254 A1 * | 1/2006 | Ross | 726/27 |
| 2006/0069668 A1 * | 3/2006 | Braddy et al. | 707/2 |
| 2006/0069683 A1 * | 3/2006 | Braddy et al. | 707/9 |
| 2006/0078124 A1 * | 4/2006 | Whelan et al. | 380/273 |
| 2006/0136719 A1 * | 6/2006 | Doyle et al. | 713/157 |
| 2006/0174336 A1 * | 8/2006 | Chen | 726/11 |
| 2006/0233364 A1 * | 10/2006 | Camenisch | 380/44 |
| 2006/0248335 A1 * | 11/2006 | Frazier et al. | 713/168 |
| 2007/0014400 A1 * | 1/2007 | Wack et al. | 380/44 |
| 2007/0033392 A1 * | 2/2007 | Ganesan et al. | 713/155 |
| 2007/0033393 A1 * | 2/2007 | Ganesan et al. | 713/155 |
| 2007/0033642 A1 * | 2/2007 | Ganesan et al. | 726/10 |
| 2007/0055878 A1 * | 3/2007 | Sandhu et al. | 713/171 |
| 2007/0067618 A1 * | 3/2007 | Sandhu et al. | 713/155 |
| 2007/0101126 A1 * | 5/2007 | Choi et al. | 713/156 |
| 2007/0140481 A1 * | 6/2007 | Rajamma | 380/37 |
| 2007/0162958 A1 | 7/2007 | Kao et al. | |
| 2007/0186095 A1 * | 8/2007 | Ganesan et al. | 713/155 |
| 2007/0248232 A1 * | 10/2007 | Driscoll et al. | 380/280 |
| 2007/0258594 A1 * | 11/2007 | Sandhu et al. | 380/277 |
| 2008/0046993 A1 * | 2/2008 | Mullick et al. | 726/15 |
| 2008/0130902 A1 * | 6/2008 | Foo Kune et al. | 380/286 |
| 2008/0235517 A1 * | 9/2008 | Ohmori et al. | 713/187 |
| 2008/0276004 A1 * | 11/2008 | Thomson et al. | 709/244 |
| 2008/0282331 A1 * | 11/2008 | Teo | 726/6 |
| 2009/0006852 A1 * | 1/2009 | Qiu et al. | 713/176 |
| 2009/0013073 A1 * | 1/2009 | Chaskar et al. | 709/224 |
| 2009/0113540 A1 * | 4/2009 | Chandwani | 726/13 |
| 2009/0150665 A1 * | 6/2009 | Kaippallimalil et al. | 713/153 |
| 2009/0210932 A1 * | 8/2009 | Balakrishnan et al. | 726/5 |
| 2009/0217034 A1 * | 8/2009 | Sudia et al. | 713/156 |
| 2009/0235345 A1 * | 9/2009 | Oikawa et al. | 726/7 |
| 2009/0300707 A1 * | 12/2009 | Garimella et al. | 726/1 |
| 2009/0316886 A1 * | 12/2009 | Camenisch et al. | 380/44 |
| 2010/0104103 A1 * | 4/2010 | Guo et al. | 380/278 |
| 2010/0138909 A1 * | 6/2010 | Chen | 726/11 |
| 2010/0268956 A1 * | 10/2010 | Micali et al. | 713/176 |
| 2011/0030029 A1 * | 2/2011 | Woo | 726/1 |
| 2011/0099379 A1 * | 4/2011 | Ganesan et al. | 713/175 |
| 2011/0116628 A1 * | 5/2011 | Wack et al. | 380/44 |
| 2011/0158127 A1 * | 6/2011 | Duo et al. | 370/254 |
| 2011/0314072 A1 * | 12/2011 | Resch et al. | 707/827 |
| 2011/0321130 A1 * | 12/2011 | Tor et al. | 726/4 |
| 2011/0321152 A1 * | 12/2011 | Tor et al. | 726/12 |
| 2012/0106514 A1 * | 5/2012 | Zheng et al. | 370/331 |
| 2012/0123981 A1 * | 5/2012 | Graves et al. | 706/13 |
| 2012/0131139 A1 * | 5/2012 | Siripurapu et al. | 709/217 |
| 2012/0166576 A1 * | 6/2012 | Orsini et al. | 709/217 |
| 2012/0170751 A1 * | 7/2012 | Wurm | 380/278 |
| 2012/0210135 A1 * | 8/2012 | Panchapakesan et al. | 713/172 |
| 2012/0240196 A1 * | 9/2012 | Bhagwat et al. | 726/4 |
| 2012/0243683 A1 * | 9/2012 | Oba et al. | 380/255 |
| 2013/0090134 A1 * | 4/2013 | Heshmati | 455/456.3 |
| 2013/0243195 A1 * | 9/2013 | Kruegel et al. | 380/270 |

* cited by examiner

METHOD AND APPARATUS FOR NETWORK ACCESS CONTROL

CROSS-REFERENCE TO RELATED APPLICATION

This application claims priority to and the benefit of the filing date of U.S. Provisional Application No. 61/449,970, entitled "METHODS AND APPARATUS FOR NETWORK ACCESS CONTROL" filed on Mar. 7, 2011, the entire disclosure of which is incorporated by reference in its entirety.

BACKGROUND

As high-speed wired and wireless access to the Internet becomes more and more common, many people choose to access proprietary institutional networks using their mobile computing devices via the Internet instead of more traditional means of access and authentication, such as network-specific, pre-authenticated devices, or virtual private networks (VPNs). For example, in addition to accessing a company's private network from the office, employees may wish to access the company's private network from home, a coffee shop, an airport, a hotel room or even a vehicle. Likewise, students and professors may access a university network from school, home, or other off-campus locations. At the office or at school, the user may have a direct access to the private institutional network, but from other locations, the user first accesses the Internet, and then, via the Internet connection, accesses the private network.

Typically, only authenticated users are allowed to access a proprietary network. User authentication can be accomplished using methods such as password verification, time-based token verification, etc. Moreover, the network administrators generally require that a device such as a laptop or tablet computer used to access the private network be compliant with certain network policies. For example, the device may be inspected to determine if it is free of viruses and malware, if a token or certificate exists, and whether a required version of software is installed. These precautionary measures can mitigate the risk that an unauthorized user may gain access to computing resources and proprietary information and that such information may be accidentally or intentionally disclosed, modified and/or destroyed. A system that performs user authentication and the specified compliance checks is generally called a "network-access control" (NAC) system.

Some NACs also implement firewall functionality and enforce bandwidth and quality of service (QoS) requirements. A firewall typically provides security to the network by inspecting data packets received from an authenticated user and only allowing data packets from trusted sources to be received on certain ports. The enforcement of bandwidth and QoS specifications can ensure both that the authenticated user receives the allotted bandwidth and that the user does not exceed bandwidth constraints. These features can enhance the performance and security of computer networks.

Current systems for providing network access control include "central in-band" systems, "out-of-band" systems, and "distributed in-band" systems. In a typical central in-band system, a user's computer is connected via a switch to a private network. A dedicated in-line device, such as a server typically located higher up in the private network (e.g., at the aggregation switch or core layer of the network), manages user authentication and network policy enforcement. If the user's computer fails to meet one or more policy requirements, the dedicated device may perform corrective actions, or simply deny access. For example, the device may scan the computer for viruses and/or install a specific version of software.

A central in-band NAC usually allows for "seamless" connections to a private network as the user travels among different locations (referred to as "roaming"). When roaming, the user's computer connects to a switch other than the initial switch used to connect to the private network. However, because the dedicated device is still on the private network, the device can recognize that the user has been authenticated, and that the user's computer has been certified as meeting the network policy requirements. Therefore, the dedicated device allows the user to maintain access to the private network without requiring re-authentication or re-certification of the user's computer, even though the user's computer is now connected via a different switch. Seamless connectivity, as described above, can be beneficial to a user who roams frequently while staying connected to the private network, because user authorization and computer-compliance verification need not be repeated as the user moves around the network.

In a central in-band NAC system, however, the users may experience delays in data transfer (i.e., latency) because data from all users connecting to the private network must pass through the dedicated device. As the number of users attempting to access the private network increases, the latency also increases, and hence, the central in-band system is usually not scalable, i.e., it cannot support an unspecified, large number of users. In addition, the dedicated device is a single point of failure. If the dedicated device fails, no user may be allowed access to the private network until the device is repaired or replaced. Typically, the only solution is to add more dedicated devices, requiring significant capital expenditure and support.

One approach to solving the challenges of a central in-line device is the use of an "out-of-band" system in which a switch that is used to connect to the Internet can also perform user authentication and enforces certain network policies. Unlike a central in-band system, an out-of-band NAC system provides access-control functionality through multiple switches, and hence, the system does not have a single point of failure. Specifically, if one switch fails, the users attempting to connect to the Internet via the failed switch may not be able to access the private network. But other users connecting via other switches may be able to access the private network. Moreover, in the out-of-band system, a single switch is generally not burdened with providing the network-access functionality to all users because different users may gain access to the private network via different switches, each switch providing the network-access functionality only to a limited number of users. Therefore, the out-of-band system is usually more scalable.

FIGS. 1A and 1B illustrate two connection methods of an "out of band" NAC solution. In FIG. 1A, one or more wired users (also referred to as a "client" or "clients") 12 are connected directly to an Ethernet switch 14. In FIG. 1B, one or more users (also referred to as a "client" or "clients") 22 wirelessly connect to an autonomous access point (AP) 26, which is connected an Ethernet switch 24.

In FIGS. 1A and 1B, the Ethernet switch 14, 24 acts as the NAC enforcement point (i.e. it provides virtual LAN (VLAN) assignment using, for example, IEEE 802.1q VLAN tagging). An out-of-band NAC solution includes an out of band NAC element 52 that performs user authentication and communicates with the Ethernet switch 14 over logical connection 54. An out of band NAC element 58 performs user authentication and communicates with the Ethernet switch 24 over logical connection 56. However, the out of band NAC elements 52 and 58 do not process data transmitted and received by a "client," such as wired user 12 or wireless user 22. The enforcement point (i.e., the switch 14 and the switch 24 in this example) stores the client's session information (e.g., access control list (ACL) and virtual local area network (VLAN) assignment) after the client completes the required authentication. The ACL is a list of devices that have been certified to have met the authorization and policy requirements. The VLAN identifies parts of the private network to which the authorized client may have access. As used herein, "client" may refer to a user seeking access to a private network, and also to the user's computing device (e.g., laptop or desktop computer, mobile device, smart phone, pad computer, gaming device, etc.).

FIG. 2 is a diagram further illustrating the "out of band" connection of FIG. 1B. In FIG. 2, a wireless client 32 initially connects wirelessly to a first autonomous access point AP1, 36. A first Ethernet switch, 34, to which autonomous AP1, 36 connects, is also logically connected to an "out of band" NAC element 60 over logical connection 64. The out of band NAC element 60 is physically connected to switch 48 over connection 59. The out of band NAC element 60 authenticates the client 32 and the client's session information (e.g., ACLs and VLAN) is configured and stored in the out of band NAC element 60. The autonomous AP1, 36 typically does not maintain the client's NAC session information. After authentication, the first Ethernet switch 34 forwards the client's traffic (i.e., data received from and sent to the client 32) based on policy enforcement rules.

If the authenticated wireless client 32 roams 38 to a different location, the client 32 may attempt to connect to the Internet via a second autonomous access point AP2, 46 which is connected to a second Ethernet switch 44. The first Ethernet switch 34 and the second Ethernet switch 44 are connected to a switch 48, which can be connected to a LAN 49 such as the Internet.

The Ethernet switches 34 and 44 generally cannot coordinate the session information pertaining to the client 32, and hence, the second Ethernet switch 44 does not know whether the client 32 has already been authorized. Accordingly, the second Ethernet switch 44 cannot route the client's traffic, and the client's data packets from any active TCP/UDP connections are dropped until the client 32 successfully re-authenticates using the second Ethernet switch 44. The second Ethernet switch 44 is also logically connected to the out of band NAC element 60 over connection 66. Only after the re-authentication is the client's session information available at the second Ethernet switch 44, enabling the second Ethernet Switch 44 to route client's data packets. Consequently, the wireless client 32 is not provided with seamless mobility (e.g., maintaining active TCP/UDP sessions as the user roams).

Nevertheless, out-of-band systems also have some disadvantages. For example, a switch is typically not configured to provide a firewall and enforce bandwidth and QoS requirements. Furthermore, when a user's computer connects to a switch in an out-of-band system, that switch performs user authentication and network-policy-compliance verification. As a user roams from one switch to another, each switch must repeat these steps, and hence, the out-of-band system cannot provide seamless connectivity to a roaming user.

Accordingly, there is a need for an improved method and apparatus for providing network-access control.

SUMMARY

Embodiments of a method and apparatus for network access control include an apparatus for granting a computing device access to a network, the apparatus having a plurality of substantially similar access devices, wherein each access device comprises a status-determination module to determine an access status based at least in part on whether the computing device is compliant with an access policy, an access-grant module configured for receiving an access status corresponding to the computing device from one or more of the access devices, and granting the computing device access to the network according to at least one of the access status determined by the status-determination module or the received access status.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1A:
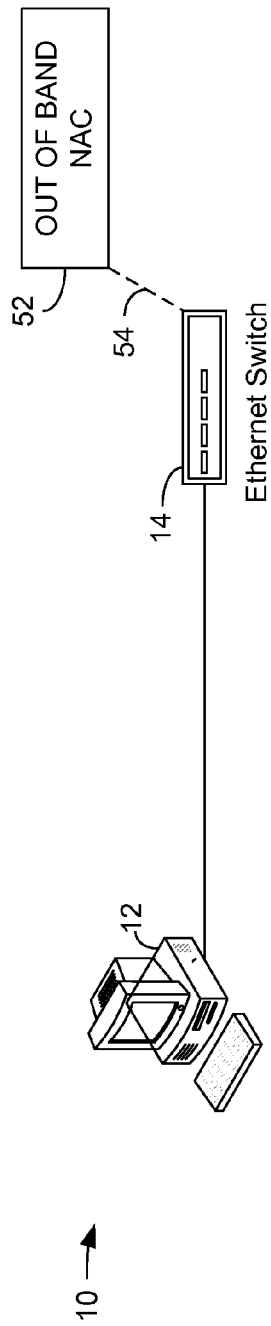
FIGS. 1A and 1B illustrate two connection methods of an "out of band" NAC solution.
Figure 1B:
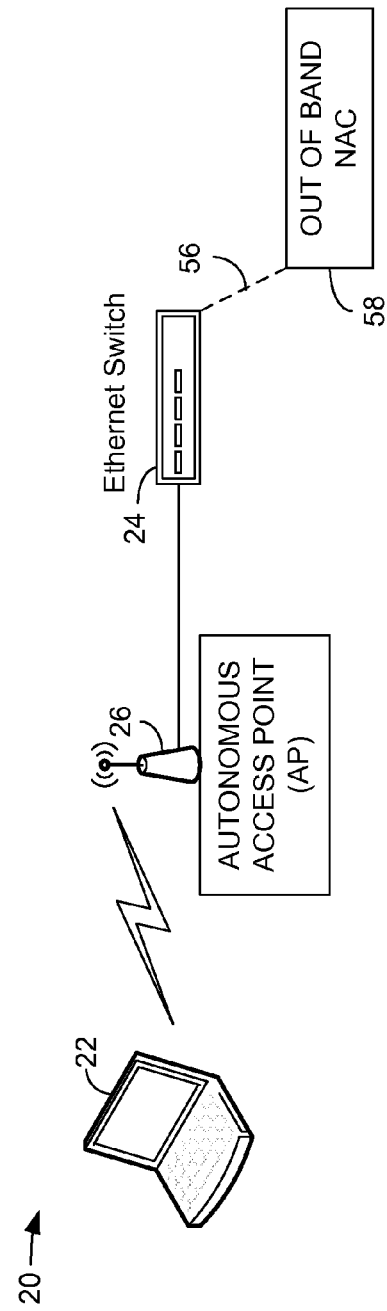
Figure 2:
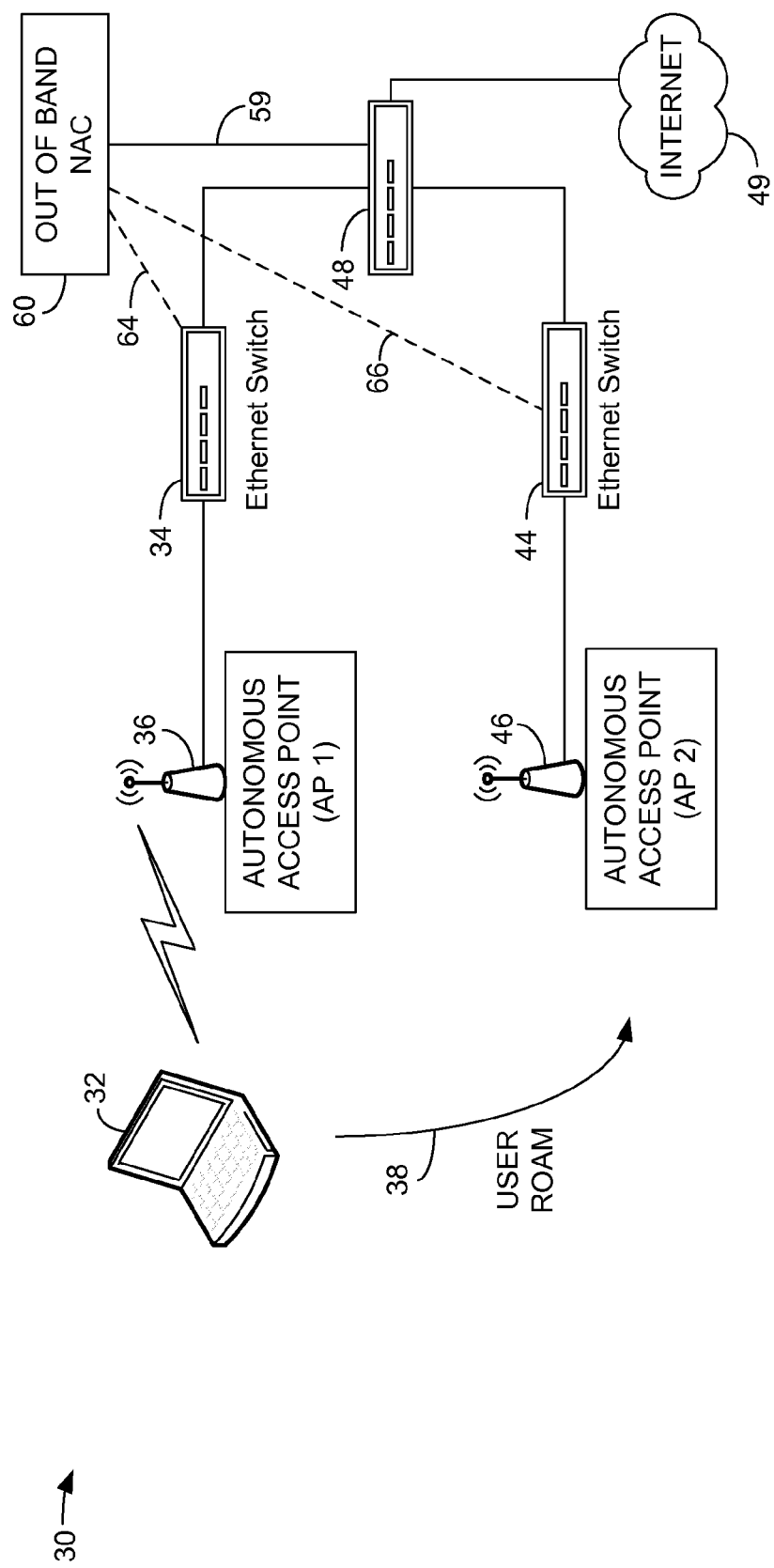
FIG. 2 is a diagram further illustrating the "out of band" connection of FIG. 1B.
Figure 3:
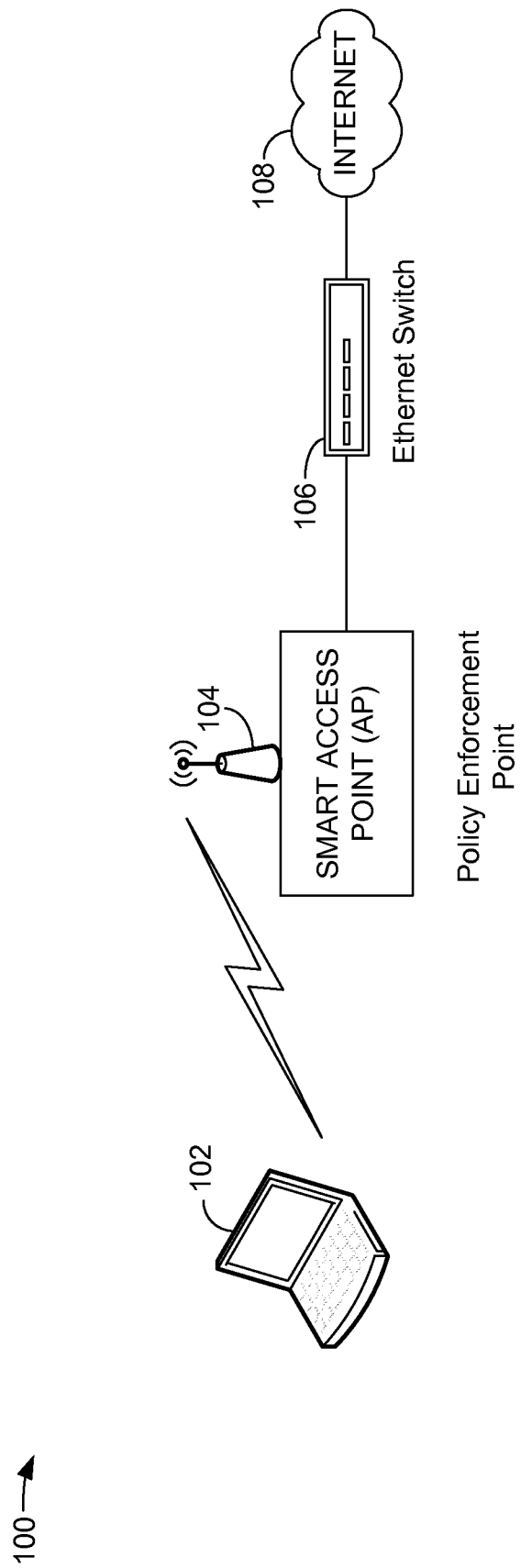
FIG. 3 is a diagram illustrating an embodiment of a smart access point (AP) in accordance with the invention.

FIG. 3 is a diagram illustrating an embodiment of a smart access point (AP) in accordance with the invention. The system 100 of FIG. 3 comprises a wireless client 102 coupled to a switch 106 through a smart AP 104. The switch 106 can be any type of network switch, and in an embodiment, can be an Ethernet switch. The switch 106 is connected to a network 108, which can be the Internet. In such a smart access device system, a smart AP 104 can provide both wired and wireless access, and is shown as providing wireless access in FIG. 3 for simplicity. Additionally, a conventional edge device (such as a wireless autonomous AP 36 and wireless autonomous AP 46 illustrated in FIG. 2) may also provide wireless connections to clients. Instead of requiring a separate firewall device inside the private network, the smart AP 104 can implement a firewall, maintain ACLs, or implement both. This enables direct forwarding of data from the edge device to the network, eliminating latency and single point of failure concerns of a central in-band system described above, as well as provide increased scalability.

Further, the autonomous APs 36 and 46 of FIG. 2 (sometimes also referred to as "edge devices" because they are closer to a client device than to a network backbone) may not be provided by the same vendor, and each such edge device/autonomous access point may enforce network policies in a substantially different manner than the others. Even edge devices provided by the same vendor can differ in terms of policy-enforcement functionality. For example, some commercial systems supply different policy-enforcement processes (e.g., software solutions, or embedded software solutions wherein software is integrated with custom hardware) for wireless and wired access, and these processes are not integrated.

Typically, the edge devices/autonomous access points generally do not share information (e.g., client's session information) with each other. Moreover, in some instances, a first autonomous access point may be an edge device, while a second autonomous access point may be a conventional access device provided by a third-party vendor, and, as described above, the edge device (for example, autonomous access point AP1, 36) may not interoperate with autonomous access point AP2, 46, which may be a third party access device). Accordingly, a client roaming from the first autonomous AP 36 to the second autonomous AP 46 must re-authenticate, as discussed above. During re-authentication, the authentication and policy enforcement procedures at the first autonomous AP 36 and the second autonomous AP 46 may be different. A network administrator may also have to configure and manage the authentication and policy-enforcement procedures differently on the first autonomous AP 36 and the second autonomous AP 46.

In the embodiment of a system 100 shown in FIG. 3, the client 102 connects to the Internet 108 via a third-party access device such as a switch 106. The smart AP 104 connected to the switch 106 performs policy enforcement and user authentication so that a user of the client 102 can connect to a private network via the switch 106.

Figure 4:
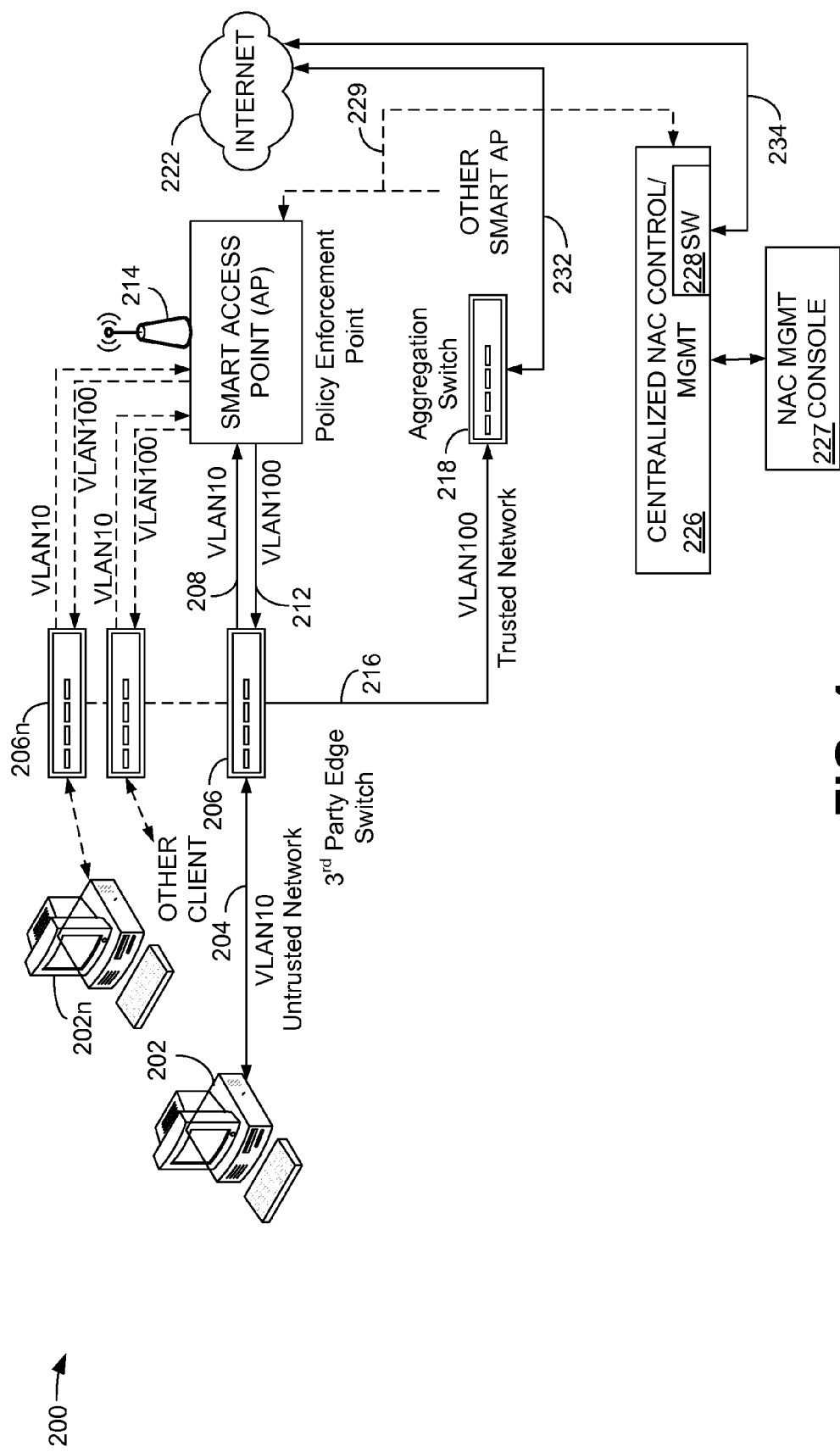
FIG. 4 is a diagram illustrating an embodiment of a smart access point (AP) in accordance with the invention.

FIG. 4 is a diagram illustrating an embodiment of a system 200 having a smart access point (AP) in accordance with an embodiment of the method and apparatus for network access control. In the embodiment shown in FIG. 4, a client 202 connects to the Internet 222 via a third-party access device such as an edge switch 206. The smart AP 214 connected to the edge switch 206 performs policy enforcement and user authentication. The communication link 204 between the client 202 and the edge switch 206 is also arbitrarily referred to as "VLAN10" and is considered to be an "untrusted" network in that traffic to and from an unauthenticated user associated with client 202 traverses the communication link 204. The edge switch 206 is in communication with the smart AP 214 over connections 208 and 212. The connection 208 is also arbitrarily referred to as "VLAN10" and is an "untrusted" connection. The connection 212 is also arbitrarily referred to as a "VLAN100" and represents a "trusted" or "authenticated" connection because information that traverses the connection 212 is authenticated by the smart AP 214, which is the policy enforcement point. The terminology "VLAN10" and VLAN100" is arbitrary and intended to show that a "trusted" connection is different from an "untrusted" connection.

An aggregation switch 218 is connected to the edge switch 206 over connection 216 and is connected to a LAN 222, such as the Internet over connection 232. The connection 216 is also referred to as a "VLAN100" because it is a trusted connection. Untrusted information is passed from the client 202 to the edge switch 206 over connection 204. The untrusted information is then passed from the edge switch 206 to the smart AP 214 over untrusted connection 208. The smart AP 214 performs authentication of the client 202, and if the client 202 passes the authentication process, the client 202 can pass "trusted" information over connection 212 to the edge switch 206 and via the edge switch 206 to the aggregation switch 218 over trusted connection 216.

Although FIG. 4 shows one edge switch and one smart AP, a typical system comprises several switches, represented as 206n, having other clients, represented as 202n, with each switch 206n connected to at least one smart AP, and therefore the system will not be subject to a single point of failure and is scalable.

A centralized NAC control and management system 226 is connected to the aggregation switch 218 over a physical connection 234, through the Internet 222 and over a physical connection 232. The centralized NAC control and management system 226 is logically connected to the smart AP 214 through the aggregation switch 218 and connection 229.

Figure 5:
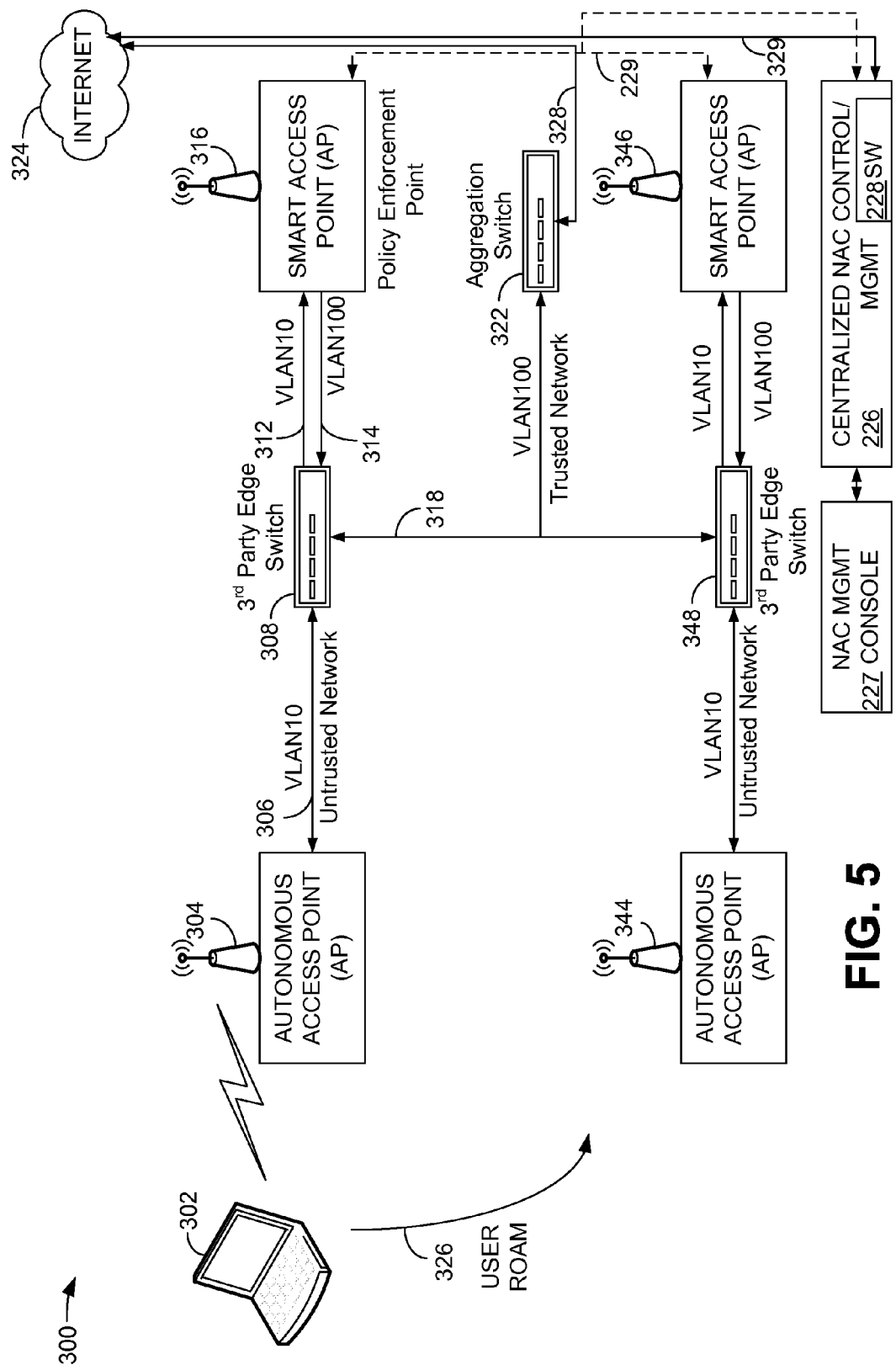
FIG. 5 is a diagram illustrating an embodiment of a system having a smart access point (AP) in accordance with another embodiment of the invention.

FIG. 5 is a diagram illustrating an embodiment of a system 300 having a smart access point (AP) in accordance with another embodiment of the method and apparatus for network access control. In the embodiment shown in FIG. 5, a wireless client 302 wirelessly connects to an autonomous AP 304, which can be a third-party access device. The autonomous AP 304 connects to an edge switch 308 over connection 306. The connection 306 is referred to as VLAN10 and is an "untrusted" connection. The connection 306 and the edge switch 308 are similar to the connection 204 and the edge switch 206 of FIG. 4.

The smart AP 316 connected to the edge switch 308 performs policy enforcement and user authentication. The edge switch 308 is in communication with the smart AP 316 over connections 312 and 314. The connection 312 is also referred to as "VLAN10" and is an "untrusted" connection. The connection 314 is also referred to as a "VLAN100" and represents a "trusted" or "authenticated" connection because information that traverses the connection 314 is authenticated by the smart AP 316, which is the policy enforcement point in this example.

An aggregation switch 322 is connected to the edge switch 308 over connection 318 and is connected to the Internet 324 over connection 328, which is similar to connection 232 of FIG. 4. The connection 318 is also referred to as a "VLAN100" because it is a trusted connection. Untrusted information is passed wirelessly from the client 302 to the autonomous AP 304 and then to the edge switch 308 over connection 306. The untrusted information is then passed from the edge switch 308 to the smart AP 316 over untrusted connection 312. The smart AP 316 performs authentication of the client 302, and if the client 302 passes the authentication process, the client 302 can pass "trusted" information over connection 314 to the edge switch 308 and via the edge switch 308 to the aggregation switch 322 over trusted connection 318.

The smart AP 316 is placed "inline" between the third-party access device (e.g., the edge switch 206 (FIG. 4), 308 (FIG. 5) and a private, trusted network, represented by the aggregation switch 218 (FIG. 4), 322 (FIG. 5). The term "inline" as used herein means that the data traffic to and from the client 202 (FIG. 4), 302 (FIG. 5) passes through the smart AP 214 (FIG. 4), 316 (FIG. 5). Therefore, unlike an out-of-band-system, the smart AP 214 (FIG. 4), 316 (FIG. 5) can provide services that can enhance network security and performance; e.g., firewall protection, QoS management, and intrusion-detection (ID), in addition to enforcing the network policies. As a typical system comprises more than one smart AP, a single smart AP may not be over burdened with providing these functions.

The smart AP 214 (FIG. 4), 316 (FIG. 5), with the assistance of the centralized NAC control and management system 226, which is connected to the aggregation switch 322 via the Internet 324 over connections 329 and 328 in FIG. 5, manages both wired and wirelessly-connected clients. In particular, when a user, such as a user associated with the client 302 (FIG. 5) roams 326 from one third-party autonomous AP 304 to another third-party autonomous AP 344, the smart AP 346 receives the user's data traffic. Before requiring the user of the client 302 to re-authenticate at autonomous AP 344, the smart AP 346 communicates with the centralized NAC control and management system 226 over logical connection 229, to determine if the user associated with the client 302 has already been authenticated to the secure network. In this instance, the centralized NAC control and management system 226, having initially authenticated the user associated with the client 302, sends the user's session information to the smart AP 346. As a result, the smart AP 346 recognizes the user of the client 302 as previously authenticated, and therefore re-authentication is unnecessary. NAC software 228 in the centralized NAC control and management system 226 may coordinate client session information between smart APs using technologies such as opportunistic key caching (OKC) or 802.11i pre-authentication. Thus, when a client 302 roams between and among the smart APs or third-party access points that are in communication with the smart APs, the user experiences uninterrupted, seamless mobility.

Another benefit of the smart AP is the ability to communicate with other smart APs to support "tunneled" clients. Such communication may occur over logical connection 229. The physical connections 329 and 328 allow communications between and among the centralized NAC control and management system 226, the aggregation switch 322 and the edge switches 308 and 348. A smart AP can "tunnel" wired or wireless users to another policy enforcement point, where additional policies may be enforced such as a content filter, or tunnel the traffic to a network located between the Internet and a private network, to prevent guest users from gaining direct access to VLANs on the private network.

A smart AP can be a single port or a multiport wired or wireless access device. For a multiple port wireless smart AP, the untrusted user traffic (i.e., traffic received from a client yet to be authorized) can be directed to a specific port on the wireless smart AP, the port being different from the port through which the trusted traffic (i.e., traffic sent to and received from the private network) flows. For a single Ethernet port, a smart AP can use, for example, an 802.1q VLAN tag to establish the VLAN10 connection to receive the untrusted user traffic. The smart AP shown in FIGS. 4 and 5 uses different VLANs to segregate the trusted and untrusted traffic into two logical groups, namely, untrusted and trusted, as described above. The clients connect to the switch using the untrusted ports, which may be wired VLAN access ports (e.g., VLAN10), wireless SSIDs, or other ports that require authentication. The trusted ports (e.g., VLAN100) are then used after a client has been authorized and authenticated to route the client's data. Services such as Email, DNS, DHCP, etc., are provided to the trusted clients on the trusted ports.

The untrusted ports can, in some embodiments, be grouped together to create an access group that applies an administrator-determined authentication scheme to the clients connecting via the untrusted ports. The untrusted ports may also be several physical ports that span various smart APs. A third-party device (e.g., a switch) may be manually configured to recognize the trusted and untrusted VLANs or ports. The centralized NAC control/management software can then detect the untrusted and trusted VLANs on a third-party switch, and automatically configure the untrusted ports of the smart AP and create and manage the virtual switches.

Figure 6B:
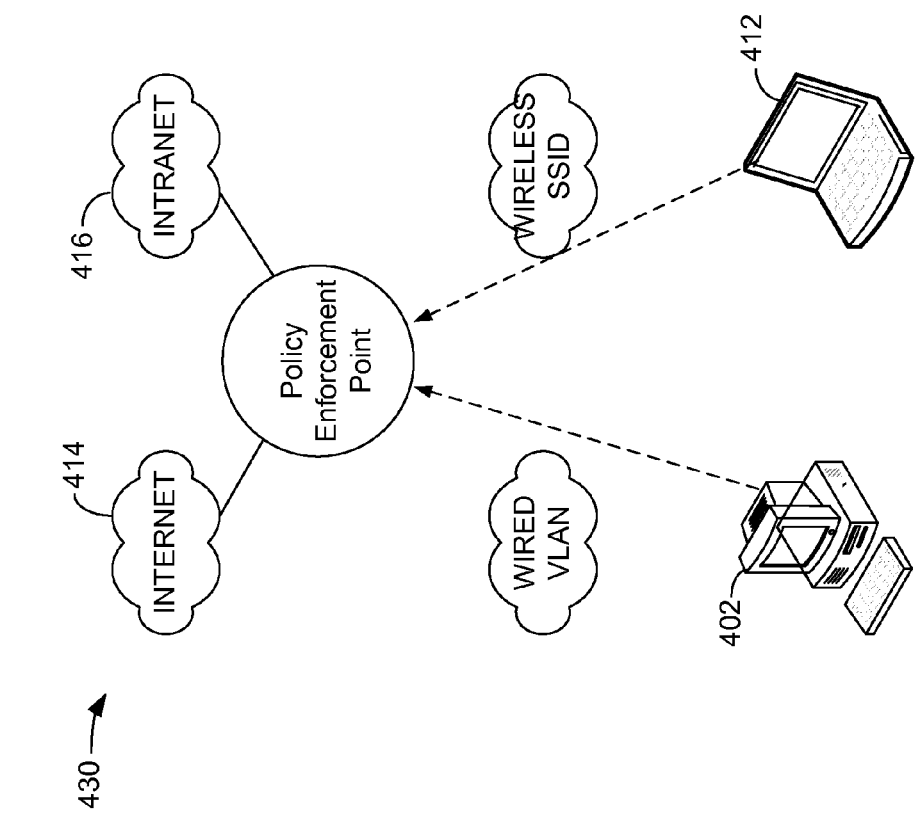
FIGS. 6A and 6B show respective physical and logical depictions of an exemplary system according to the present invention.
Figure 6A:
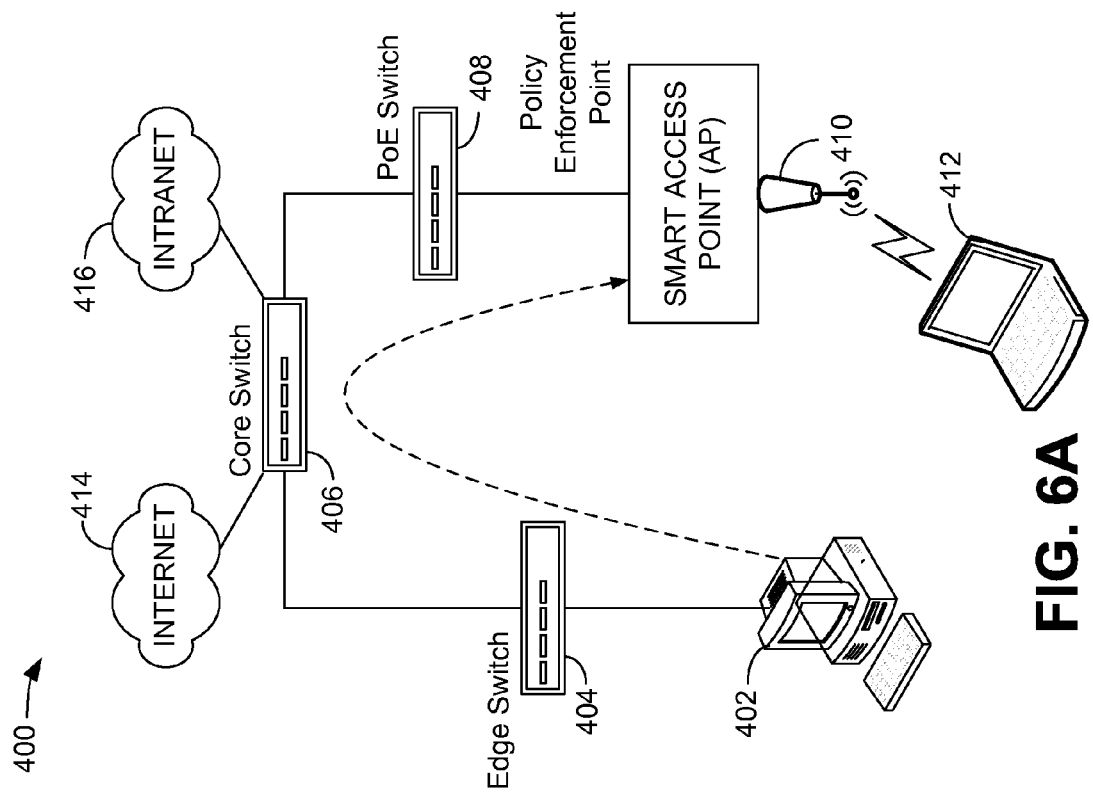

FIGS. 6A and 6B show respective physical and logical depictions of an exemplary system according to the present invention. As shown in FIG. 6A, the system 400 includes both a wired Ethernet access device 404, illustrated as an edge switch, and a wireless smart AP 410. The wired user traffic is sent via a VLAN comprising a core switch 406 and a powered over Ethernet (PoE) switch 408 to the smart AP 410, where access control policies are applied. Once the user 402 is authenticated, the traffic flows to the Internet 414 or intranet 416 (i.e., a private network), through smart AP 410. FIG. 6B shows that the access requirements from the point of view of wired user 402 and a wireless user 412 can be substantially the same, and, reciprocally from the network perspective, the wired user 402 may be substantially indistinguishable from the wireless user 412. Therefore, the exemplary system shown in FIGS. 6A and 6B can provide consistent security and management regardless of how users connect to the network.

In some instances, a large number of clients may be connected to a smart AP, either directly, or through a third-party access device. To prevent the overloading of any single smart AP, a load-balancing scheme may be employed. The load balancing is based on ports and user (e.g., client) counts. For example, a set of wired users or third-party APs are grouped on one or more VLANs. The smart AP can enable/disable the selected untrusted VLANs based on the usage metrics. If a smart AP servicing a group of users fails, then another smart AP having access to the untrusted VLAN may be enabled, facilitating substantially seamless failover.

Specifically, one or more switches, such as the switches shown in FIGS. 4 and 5, may be configured to provide one or more untrusted VLANs (denoted as Vn). Each Vn is "trunked" (e.g., routed, connected, etc.) to one or more smart APs (denoted as An) associated with the Vn. The terminology "n" in the terms "Vn" and "An" are mathematical symbols to represent an "n" number of VLANs (V) and APs (A). Generally, a Vn is "locally" connected to an associated An, i.e., data traffic to the one or more smart APs associated with a VLAN is not routed through the Internet core. In some instances, however, the traffic may be routed through the core, as shown in FIG. 6A. In a NAC management console 227, each VLAN Vn is assigned to an An by one-to-one, one-to-many, many-to-one, or many-to-many mapping.

Initially, the load of the Vn is balanced across the An. For example, each smart AP in the set {An} may be associated with one or more Vns, such that all APs receive traffic from substantially the same number of clients. If one of the smart APs (e.g., A1) associated with a VLAN (referred to as "Vk" where "k" represents a "k" number of sets of VLANs) fails, one or more of the other smarts APs (e.g., A2, A5, A9, etc.) may be assigned to the VLAN Vk, such that the average load of all operating smart APs is substantially the same. The average load can be determined based on the number of associated clients, the number of expected or potential clients, the number of tunneled clients, or a combination of these parameters. A potential client can be one that is not currently using a certain smart access AP, but due to roaming, is expected to use that smart access AP. The smart AP newly associated with the VLAN Vk may be trunked locally or through the core switch 406, as shown in FIG. 6A. On some occasions, the failure of a smart AP can be only momentary. Therefore, to avoid excess reassignments of smart APs to VLANs, the Vns associated with a failed An are not assigned to the other Ans for a certain duration (e.g., 2 minutes).

In an exemplary scalable NAC system, the data throughput capacity scales substantially linearly as the number of smart APs increases. For example, if one device supports data rates of about 300 Mbps, then N devices support data rates of up to about N*300 Mbps. The user's identity based network access control (NAC), and the related policy-enforcement requirements can be supported at substantially all throughput levels in this scalable system as additional smart APs are added. A user may seamlessly roam from any access device (e.g., smart AP or conventional, third-party access device) to any other access device in the system, without impacting throughput, or requiring re-authentication. Moreover, the scalable system does not require user data to be sent to a centralized device (e.g., non-access devices) to apply various policies or to support seamless roaming. By avoiding this bottleneck, latency is reduced and performance is improved. In applications such as voice and video applications on the private network, the increase in speed and accessibility to the network greatly improves the overall user experience and productivity.

Figure 7:
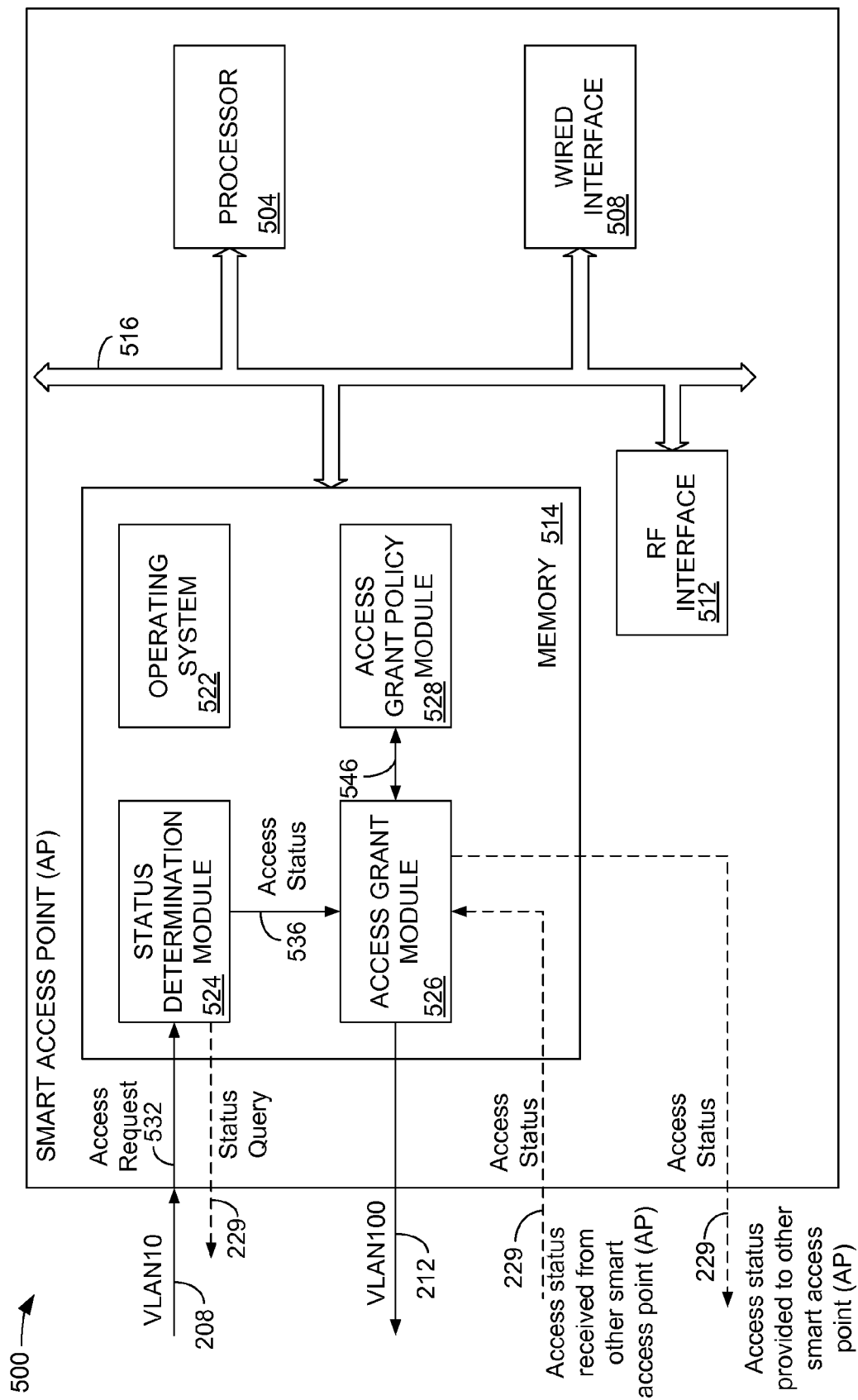
FIG. 7 is a functional block diagram illustrating an embodiment of a smart access point (AP).

FIG. 7 is a functional block diagram illustrating an embodiment of a smart access point (AP) 500. The smart AP 500 is a general example of a smart AP and can represent any of the smart APs described herein. The smart AP 500 includes a processor 504, a wired network interface 508, a radio frequency (RF) interface 512, and a memory 514 connected over a system bus 516. The system bus 516 can be any system bus representing physical and logical connections that enable communication between and among any of the elements connected to it.

The processor 504 can be any special purpose or general purpose processor, microprocessor, or any other processing element or collection of processing elements configured to execute instructions and control the overall operation of the smart AP 500.

The wired network interface 508 includes any of the systems software and modules required to allow the smart AP 500 to connect over a local area network (LAN), a wide area network (WAN), or any other network. The RF interface 512 includes radio frequency processing elements, filters, upconversion circuitry, downconversion circuitry, and any other elements that allow the smart AP 500 receive and transmit signals wirelessly.

The memory 514 may comprise volatile memory, nonvolatile memory, distributed memory, random access memory (RAM), read only memory (ROM), flash memory, and any other type of memory. In an embodiment, the memory 514 includes software elements including, but not limited to, an operating system module 522, which includes the logic and or software elements or modules used to operate the smart AP 500.

The method and apparatus for network access control can be implemented in hardware, software, or a combination of hardware and software. When implemented in hardware, the apparatus for network access control can be implemented using specialized hardware elements and control logic. When the method and apparatus for network access control is implemented at least partially in software, or implemented in an apparatus, system or device that employs software control of various elements or components, the software portion can be used to control the various components of the method and apparatus for network access control, and particularly, the smart AP 500. The software can be stored in the memory 514 and executed by a suitable instruction execution system, such as processor 504. The hardware implementation of the method and apparatus for network access control can include any or a combination of the following technologies, which are all well known in the art: discrete electronic components, integrated electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the method and apparatus for network access control comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

In an embodiment, the memory 514 includes a status determination module 524, an access grant module 526 and an access grant policy module 528, which can all be embodied as software elements or modules.

In an embodiment, an access request from a client computing device is received over LAN connection 208 (FIG. 4) and 312 (FIG. 5) and then received over connection 532. The access request can be made in the form of sending a dynamic host configuration protocol (DHCP) discover packet, which is received by the status determination module 524. In response to the access request, the status determination module 524 can send a query over logical connection 229 to any other smart AP or to the software 228 in the centralized NAC control and management system 226 to attempt to learn the status of the client computing device. As used herein, the connection 229 is defined as a network, shared connection, system bus, or any other physical and/or logical connection over which a smart AP can bi-directionally communicate with one or more other smart APs and/or with the centralized NAC control and management system 226.

Once the status of the client computing device is determined, the status determination module 524 provides the access status to the access grant module 526 over connection 536. If the access status provided over connection 536 indicates a "grant access" condition, then the access grant module 526 provides a "trusted" connection to the client computing device using VLAN100 connection 212, as described above.

The specific data connections are not shown in FIG. 7 for simplicity. Those skilled in the art will understand how such connections are formed.

If the access status provided by the status determination module 524 is anything other than a "grant access" condition, then, the access grant module 526 may, in an embodiment, communicate with the access grant policy module 528 over connection 546. The access grant policy module 528 includes the logic, software, firmware, algorithms, and processing capability to allow the access grant module 526 to apply one or more access policies and to determine the access status of a client computing device.

Figure 8:
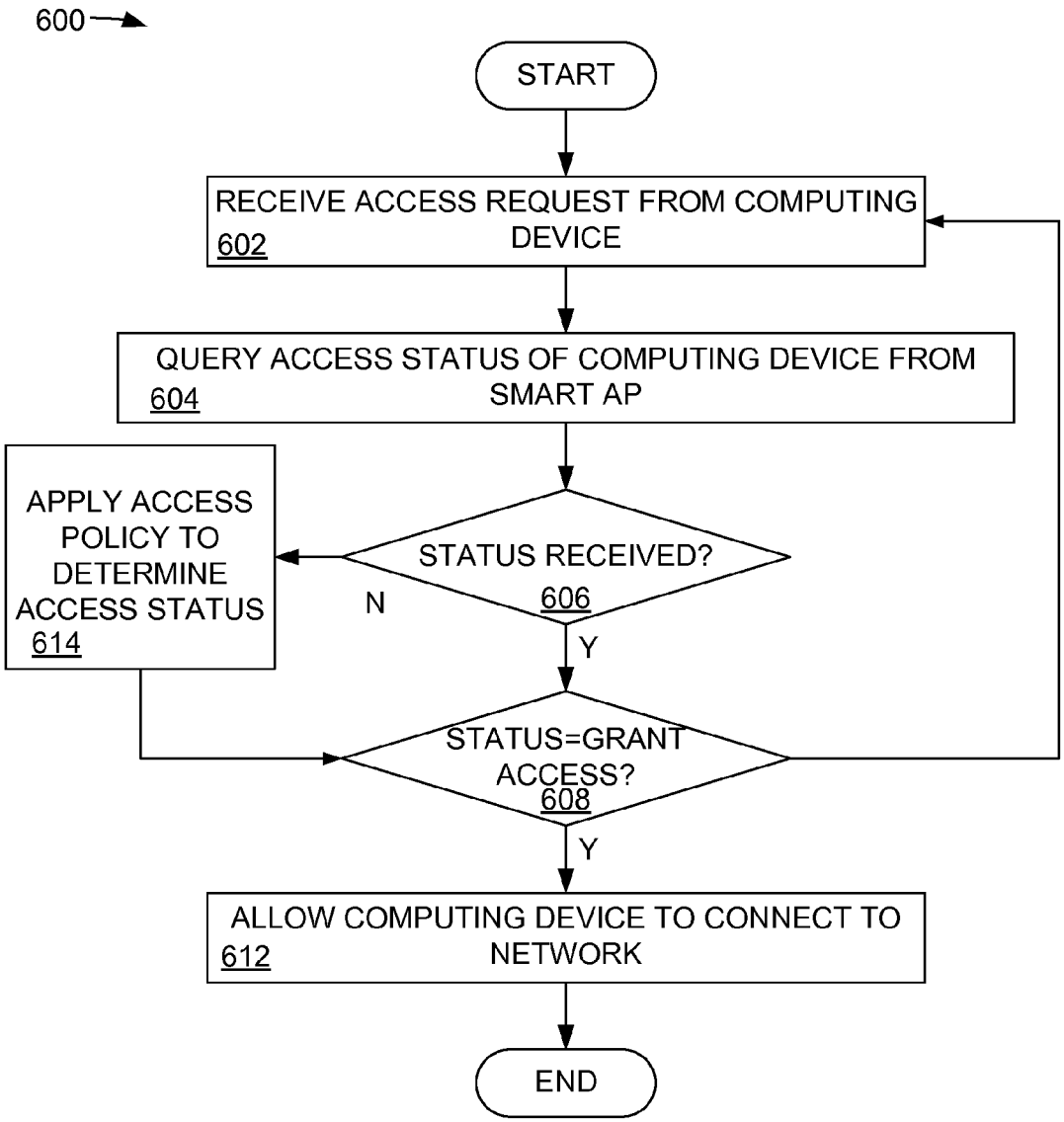
FIG. 8 is a flow chart describing the operation of an embodiment of a method for network access control.

FIG. 8 is a flow chart describing the operation of an embodiment of a method for network access control. The steps in the flow chart 600 can be performed in or out of the order shown, and in some instances, may be performed in parallel.

In block 602 an access request sent by a computing device is received by the status determination module. The access request can be made in the form of sending a dynamic host configuration protocol (DHCP) discover packet, which is received by the status determination module 524.

In block 604 the status determination module queries the access status of the computing device. For example, the status determination module 524 can send a query over connection 229 to any other smart AP or to the software 228 in the centralized NAC control and management system 226 to obtain the status of the computing device.

In block 606 it is determined whether the access status is received. If, in block 606 the access status is received, then, in block 608, it is determined whether the received access status indicates a "grant access" condition. If, in block 608 it is determined that the status does not indicate a "grant access" condition, the process returns to block 602.

If, in block 608 the received access status indicates a "grant access" condition, then, in block 612, the smart AP allows the computing device to connect to the network by providing a "trusted" connection to the client computing device using VLAN100 connection 212.

If, in block 606 the access status is not received, then, in block 614, the access grant module will apply access grant policies to determine the access status. The process then proceeds to block 608.

Figure 9:
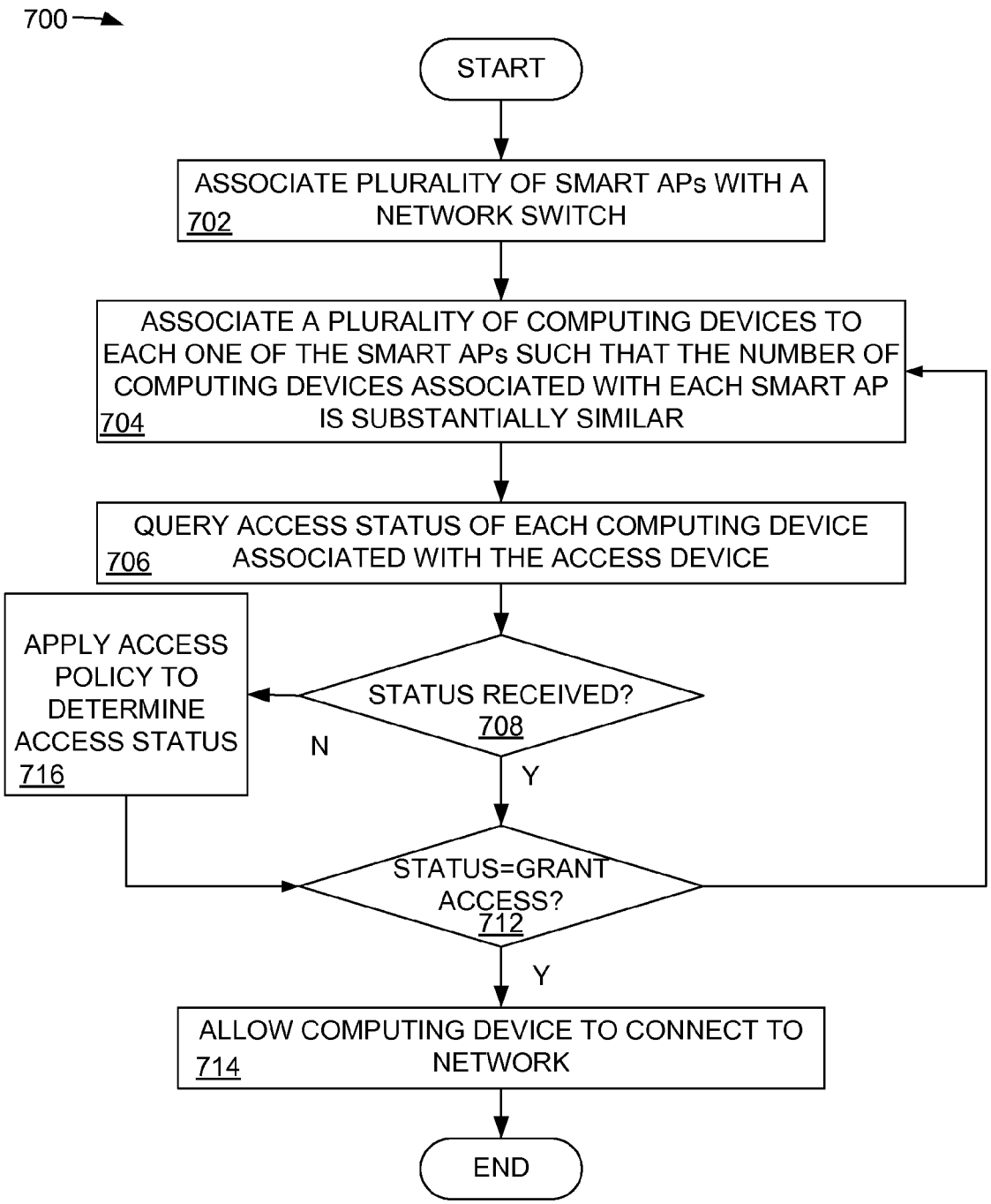
FIG. 9 is a flow chart describing the operation of an alternative embodiment of a method for network access control.

FIG. 9 is a flow chart describing the operation of an alternative embodiment of a method for network access control.

In block 702, a plurality of smart APs are associated with a network switch. In block 704, a plurality of computing devices are associated with each one of the smart APs such that the number of computing devices associated with each smart AP is substantially similar.

In block 706 the status determination module queries the access status of each computing device associated with a given smart AP. For example, the status determination module 524 can send a query over connection 229 to any other smart AP or to the software 228 in the centralized NAC control and management system 226 to obtain the status of the computing device.

In block 708 it is determined whether the access status is received. If, in block 708 the access status is received, then, in block 712, it is determined whether the received access status indicates a "grant access" condition. If, in block 712 it is determined that the status does not indicate a "grant access" condition, the process returns to block 704.

If, in block 712 the received access status indicates a "grant access" condition, then, in block 714, the smart AP allows the computing device to connect to the network by providing a "trusted" connection to the client computing device using VLAN100 connection 212.

If, in block 708 the access status is not received, then, in block 716, the access grant module will apply access grant policies to determine the access status. The process then proceeds to block 712.

While various embodiments of the invention have been described, it will be apparent to those of ordinary skill in the art that many more embodiments and implementations are possible that are within the scope of this invention.

What is claimed is:

1. An apparatus for granting a computing device access to a network, the system comprising a plurality of substantially similar access devices, wherein each access device comprises:
    a physical network port configured to provide an untrusted logical network port and a trusted logical network port;
    a wireless network port;
    a status-determination module to determine an access status based at least in part on whether the computing device is compliant with an access policy, the status-determination module responsive to an access request received from the computing device via the untrusted logical network port of the physical network port to which the computing device is connected; and
    an access-grant module configured for receiving an access status corresponding to the computing device from one or more of the access devices, and granting the computing device access to the network via the trusted logical network port of the physical network port according to at least one of the access status determined by the status-determination module or the received access status.

2. The apparatus of claim 1, wherein the determination of the access status by the status-determination module further comprises authenticating a user at the computing device.

3. The apparatus of claim 1, wherein the access-grant module is further configured for sending the access status determined by the status-determination module to another access device.

4. The apparatus of claim 3, wherein a first client corresponds to a wired user and a subsequent client corresponds to a wireless user.

5. The apparatus of claim 4, wherein the first client and the second client correspond to the same user, and the authentication provided for the first client is transferred from a first access device to a second access device, thereby allowing the second client to be authenticated using the authentication provided by the first access device for the first client.

6. The apparatus of claim 3, wherein the access-grant module sends the access status determined by the status-determination module directly to another access device.

7. The apparatus of claim 3, wherein the access-grant module sends the access status determined by the status-determination module to a centralized network access control and management system.

8. A method of an access device granting a computing device access to a network, the method comprising the steps of:
    receiving an access request from the computing device via an untrusted logical network port of a physical network port of the access device;
    querying an access status corresponding to the computing device from one or more access devices;

if the access status is received as grant access, the access device allowing the computing device to connect to the network via a trusted logical network port of the physical network port;

if the access status is not received, the access device determining the access status by applying an access policy;

if the access status is determined to be grant access, the access device allowing the computing device to connect to the network via the trusted logical network port of the physical network port; and responding to access requests received via a wireless network port of the access device.

9. The method of claim 8, wherein the determining the access status further comprises authenticating a user at the computing device.

10. The method of claim 8, further comprising sending the access status to another access device.

11. The method of claim 10, wherein a first client corresponds to a wired user and a subsequent client corresponds to a wireless user.

12. The method of claim 11, wherein the first client and the second client correspond to the same user, and an authentication provided for the first client is transferred from a first access device to a second access device, thereby allowing the second client to be authenticated using the authentication provided by the first access device.

13. The method of claim 10, wherein the access status is sent directly to another access device.

14. The method of claim 10, wherein the access status is sent to a centralized network access control and management system.

15. A method of granting a plurality of computing devices access to a network via a switch, the method comprising the steps of:

associating a plurality of access devices with the switch, each access device having a physical network port configured to provide an untrusted logical network port and a trusted logical network port;

associating each of the computing devices to one access device within the plurality of access devices such that the number of computing devices associated with each access device is substantially the same, a computing device of the plurality of computing devices connected to the physical network port of an associated access device;

ascertaining, at the access device, an access status corresponding to each of the associated computing devices; and allowing each computing device to access the network via the trusted logical network port if, when an access request is received from the computing device, the access status corresponding to the device is ascertained to be grant access.

16. The method of claim 15, further comprising re-associating the computing devices associated with a first access device with the other access devices in the plurality of access devices such that that the number of computing devices associated with the other access devices is substantially the same.

17. The method of claim 16, wherein a first client corresponds to a wired user and a subsequent client corresponds to a wireless user.

18. The method of claim 17, wherein the first client and the second client correspond to the same user, and an authentication provided for the first client is transferred from a first access device to a second access device, thereby allowing the second client to be authenticated using the authentication provided by the first access device.

19. The method of claim 18, wherein the access status is sent directly to another access device.

20. The method of claim 18, wherein the access status is sent to a centralized network access control and management system.

* * * * *